(12) United States Patent
Needham et al.

(10) Patent No.: US 9,656,602 B2
(45) Date of Patent: May 23, 2017

(54) ADAPTIVE ZONE OF SAFETY

(71) Applicant: Intel Corporation, Santa Clara, CA (US)

(72) Inventors: Bradford H. Needham, North Plains, OR (US); Jose K. Sia, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/353,146

(22) PCT Filed: Dec. 13, 2013

(86) PCT No.: PCT/US2013/075094
§ 371 (c)(1),
(2) Date: Apr. 21, 2014

(87) PCT Pub. No.: WO2015/088562
PCT Pub. Date: Jun. 18, 2015

(65) Prior Publication Data
US 2016/0280127 A1    Sep. 29, 2016

(51) Int. Cl.
*B60Q 1/32* (2006.01)
*B62J 6/04* (2006.01)
*H04N 9/31* (2006.01)

(52) U.S. Cl.
CPC ..... *B60Q 1/32* (2013.01); *B62J 6/04* (2013.01); *H04N 9/3173* (2013.01); *B60Q 2400/50* (2013.01)

(58) Field of Classification Search
CPC ..... B60Q 1/32; B60Q 1/00; B60Q 1/34; B60Q 1/54; B62J 6/04; B62J 3/00
(Continued)

(56) References Cited

U.S. PATENT DOCUMENTS

| | | | |
|---|---|---|---|
| 8,325,027 B2 * | 12/2012 | Tee ............... | A42B 3/044 340/321 |
| 8,905,611 B2 * | 12/2014 | Connor ............... | B62J 6/16 362/473 |

(Continued)

FOREIGN PATENT DOCUMENTS

| | | |
|---|---|---|
| JP | 2000161941 A | 6/2000 |
| JP | 2004301708 A | 10/2004 |
| KR | 2020130006915 U | 12/2013 |
| WO | WO-2015088562 A1 | 6/2015 |

OTHER PUBLICATIONS

"Bike Lane Safety Light", Xfire, [Online]. Retrieved from the Internet: <URL: http://thexfire.com/products-page/lighting-system/bike-lane-safety-light-duplicate>, (Accessed Oct. 14, 2013), 4 pgs.

(Continued)

*Primary Examiner* — Toan N Pham
(74) *Attorney, Agent, or Firm* — Schwegman Lundberg & Woessner, P.A.

(57) ABSTRACT

Various systems and methods for providing an adaptive zone of safety are described herein. An apparatus comprises a projector to project a lighted shape on a travel surface, the lighted shape demarcating the adaptive zone of safety; a monitor to monitor a path of a pedestrian travelling over the travel surface; and a computing module to adaptively adjust the lighted shape based on at least one of the travel surface or the path.

23 Claims, 6 Drawing Sheets

(58) Field of Classification Search
USPC ....... 340/432, 425.5, 332; 362/473, 509, 84, 362/257, 276
See application file for complete search history.

(56) References Cited

U.S. PATENT DOCUMENTS

| | | | | |
|---|---|---|---|---|
| 9,221,509 | B2* | 12/2015 | Lai | B62J 6/001 |
| 2004/0041983 | A1 | 3/2004 | Bleiner | |
| 2005/0246100 | A1* | 11/2005 | Nath | G08G 1/164 |
| | | | | 701/301 |
| 2008/0219014 | A1* | 9/2008 | Loibl | B62J 6/00 |
| | | | | 362/473 |
| 2010/0283590 | A1 | 11/2010 | Tee et al. | |
| 2011/0075403 | A1* | 3/2011 | Niezrecki | B62J 6/00 |
| | | | | 362/183 |
| 2014/0055252 | A1* | 2/2014 | Ascencio | B60Q 1/50 |
| | | | | 340/425.5 |

OTHER PUBLICATIONS

"International Application Serial No. PCT/US2013/075094, International Preliminary Report on Patentability mailed Jun. 23, 2016", 9 pgs.

"International Application Serial No. PCT/US2013/075094, International Search Report mailed Sep. 17, 2014", 3 pgs.

"International Application Serial No. PCT/US2013/075094, Written Opinion mailed Sep. 17, 2014", 7 pgs.

"Light Lane: About", [Online]. Retrieved from the Internet: <URL: http://www.lightlanebike.com/about.html>, (Accessed Oct. 14, 2013), 1 pg.

Freeman. Mark, et al., "Scanned Laser Pico-Projectors: Seeing the Big Picture (with a Small Device)", Optics & Photonics News, [online]. Retrieved from the Internet: <URL: http://www.microvision.com/technology/pdf/OPN_Article.pdf>, (May 2009), 7 pgs.

* cited by examiner

ADAPTIVE ZONE OF SAFETY

This application is a U.S. National Stage Application under 35 U.S.C. 371 from International Application No. PCT/US2013/075094, filed Dec. 13, 2013, which is hereby incorporated by reference in its entirety.

TECHNICAL FIELD

Embodiments described herein generally relate to safety devices and in particular, to an adaptive zone of safety.

BACKGROUND

Bicycles, cars, and pedestrians share the roads. Roads often lack dedicated lanes for bicyclists, pedestrians, or other types of vehicles. As a result, at night or at other times when visibility is reduced, those sharing the road with cars and trucks are at a greater risk.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

At night or at other times when visibility is reduced, pedestrians and bicyclists are at a greater risk of being hit by a car or other vehicle. Some systems exist that mount on a bicycle and draw a virtual bike lane for the bicyclist. The virtual bike lane may be drawn by projecting a laser line by and around the bicycle. While such methods may improve the safety of the bicyclist, the width of the virtual bike lane is a fixed size. Because the projected bike lane is a fixed size, it does not accommodate for the various conditions of the bicyclist, the road, or the weather. What is needed is a system that senses various conditions and adapts a projected virtual lane that is reflective of the conditions. Using sensors and inferential models, the systems and methods described herein determine the amount or shape of the space currently needed by a bicyclist or pedestrian and adapts a virtual lane to the moment.

In this description, systems, methods, and machine-readable media including instructions are disclosed that provide a lane marker that is adaptive to environmental conditions, the condition of the pedestrian, and traffic conditions. For example, when pavement is wet from rain, a larger zone of safety may be appropriate to provide more safe area if the pedestrian were to fall or lose control of a bicycle or other personal transportation vehicle. The condition of the travel surface may also be used as a factor when determining the size or shape of the zone of safety. In addition, the travel surface's composition, position, traffic congestion, and other factors may be used as factors. For example, whether the travel surface is paved or unpaved, covered with gravel, dirt, wood chip, or other material; whether the travel surface is wet, covered with ice or snow, or otherwise impaired may be used as factors.

Figure 1:
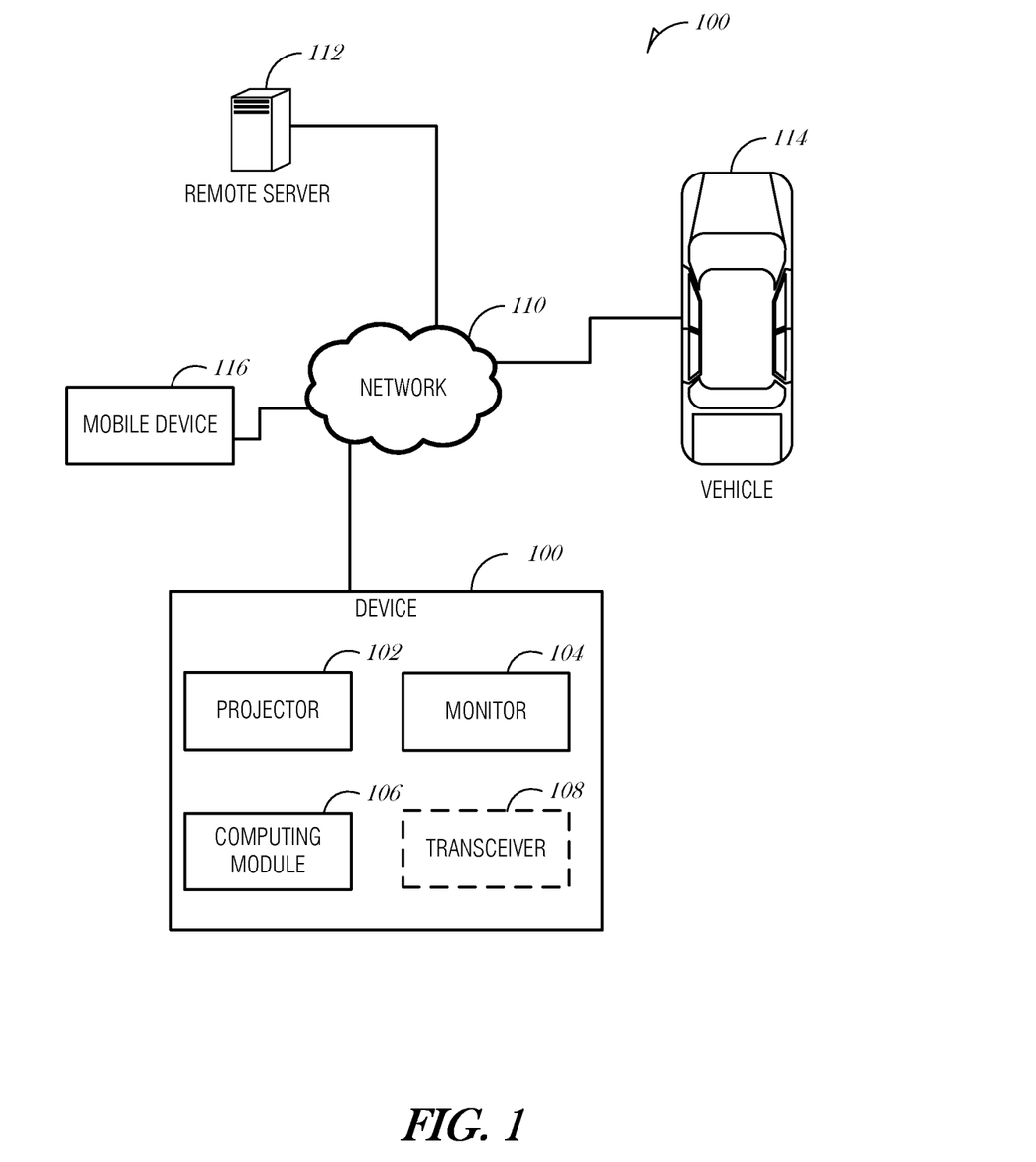
FIG. 1 is a schematic drawing illustrating a device to project an adaptive zone of safety, according to an embodiment.

FIG. 1 is a schematic drawing illustrating a device 100 to project an adaptive zone of safety, according to an embodiment. The device 100 may include a projector 102, a monitor 104, a computing module 106, and a transceiver 108. The device 100 may be connected to a network 110 via the transceiver 108. Using the network 110, the device 100 may communicate with a remote server 112, a vehicle 114, or a mobile device 116 (e.g., a mobile phone, personal digital assistant, wearable device, or the like).

The remote server 112 represents various servers, such as may exist in a cloud, to determine or provide weather conditions, traffic conditions, road conditions, or other data used to determine a size of a zone of safety. The remote server 112 may be used to determine the size of the zone of safety. Alternatively, the size of the zone of safety may be determined locally, such as at the device 100 or the mobile device 116.

The vehicle 114 may be any type of vehicle, such as a car, van, truck, or the like. In addition, the vehicle 114 may be a personal transportation device operated by another pedestrian.

The projector 102 may be any type of light source, such as laser, light emitting diode (LED), compact fluorescent light, or other lighting mechanism, combined with mirrors, lenses, reflectors, or other beam focusing technology to produce an adaptive zone of safety. The adaptive zone of safety may be delineated by one or more lines, a semi-solid or solid shape, or other patterns or shapes projected on a travel surface. Thus, in an embodiment, the projector 102 projects a lighted shape on a travel surface, the lighted shape demarcating the adaptive zone of safety. In an embodiment, the lighted shape comprises a single line. In another embodiment, the lighted shape comprises a pair of approximately parallel lines. In other embodiments, the lighted shape may comprise a trapezoid, a circular or oval shape, a hash pattern, a striped pattern, or a solid fill.

The monitor 104 may include various sensors or other mechanisms to detect motion and store distance traveled. The monitor 104 may include or be communicatively coupled with an accelerometer, a gyroscope, a storage device, a global positioning system (GPS) receiver, or other devices to detect the pedestrian's motion, path of travel, velocity, acceleration, orientation, attitude, or the like. In an embodiment, the monitor 104 monitors a path of a pedestrian travelling over the travel surface. Based on the path, the computing module 106 adaptively adjusts the lighted shape based on at least one of the travel surface or the path.

In an embodiment, the computing module 106 adaptively adjusts the lighted shape by monitoring the path to determine a degree of wobble of the path and adjusting the size of the lighted shape according the degree of wobble. Wobble may be defined as the amount of lateral movement a pedestrian exhibits over a period of time. Wobble may be viewed as the variance in the pedestrian's path. Alternatively, wobble may be viewed as the maximum lateral distance away from a normalized travel path. In an embodiment, the computing module 106 monitors the path to determine the degree of wobble comprises sensing lateral movement of the pedestrian over a period of time using at least one of an accelerometer and a gyrometer. In a further embodiment, the computing module 105 compares the lateral movement to a historical wobble value and calculates an appropriate size of the lighted shape based on the comparison. For example, the lighted shape may be increased in size when there is more wobble in a pedestrian's path. The pedestrian may be tired, ill, physically impaired, distracted, or intoxicated, in which case the zone of safety should be increased to provide a larger buffer around the pedestrian. Other pedestrians or vehicles in proximity will also be alerted to the pedestrian's larger zone of safety and may accommodate the pedestrian during her travel.

While the zone of safety may be modified based on a pedestrian's travel path, the zone of safety may also be modified based on an attitude or orientation of a personal transportation device being operated by the pedestrian. Thus, in an embodiment, the pedestrian is operating a personal transportation device. In various embodiments, the personal transportation device comprises one of a bicycle, a unicycle, a skateboard, a kick scooter, a wheelchair, or inline skates. The computing module 106 may adaptively adjust the lighted shape by detecting an attitude of the personal transportation device and adjusting the size of the lighted shape according the attitude. Attitude, as used in this document, refers to the relative orientation of an object in three dimensions. Attitude may be deconstructed to the three planes where the front to back orientation is referred to as the pitch, the side to side orientation is referred to as the roll, and any rotational movement around the z-axis is referred to as the yaw. The lighted shape may be adjusted to compensate for changes in one or more of the three planes in order to maintain a consistent shape of the zone of safety. In an embodiment, the computing module 106 detects the attitude of the personal transportation device using a gyrometer to detect the attitude.

When a personal transportation device turns, because of the attitude change (e.g., roll) a pedestrian may be more susceptible to falling or losing control. Thus, to provide a safer zone of safety, the inside portion of the zone of safety (with respect to the inside of direction of the turn) should be extended outward, away from the personal transportation device. Doing as such will provide a larger buffer in case of a fall, loss of control, or other maneuver that quickly or unexpectedly moves the personal transportation device into the turn. Thus, in an embodiment, when detecting the attitude of the personal transportation device, the computing module 106 detects that the personal transportation device is turning and adjusts the size of the lighted shape to accommodate the turning.

When a personal transportation device is travelling over an uneven, slippery, or otherwise unsafe surface, the pedestrian operating the personal transportation device may be at a higher risk of falling, losing control, or having to execute an emergency maneuver. So, based on the surface's condition, the appropriate safety zone may be larger or smaller Thus, in an embodiment, the computing module 106 adaptively adjusts the lighted shape by determining a condition of the travel surface and adjusting the size of the lighted shape according the condition of the travel surface.

The surface condition may be determined by various mechanisms, such as by a camera to detect rocks, gravel, pavement, or other objects on or near the surface. The surface condition may also be determined by a microphone or other sensor to detect sounds that may indicate certain conditions. Thus, in an embodiment, the computing module 106 determines the condition of the travel surface by accessing a sensor mounted to a personal transportation vehicle that the pedestrian is operating to obtain an environmental variable and using the environmental variable to identify the condition of the travel surface. In an embodiment, the sensor comprises a moisture sensor and the environmental variable comprises wetness. In this case, the condition of the travel surface may be identified as being some degree from dry to wet sensed by the sensor.

In addition to the previously discussed factors, or as an alternative to them, the amount of traffic on the travel surface may be used to determine the width of the projected zone of safety. Thus, in another embodiment, the sensor comprises microphone incorporated in a mobile device 116 and the environment variable comprises a noise level indicative of other traffic on or near the travel surface. In this case, the condition of the travel surface is identified as being some degree from free flowing to congested. In a more congested area of traffic, a larger zone of safety may be appropriate. For example, during rush hour with many vehicles on the road, a bike lane created by the projector 102 may be widened to provide safer travel for the pedestrian. A default width, such as five feet, may be used in normal or lower traffic. When a higher congestion of vehicles is detected, a wider bike lane, such as seven feet, may be used. After detecting that traffic levels are less congested, the width of the projected bike lane may be reduced to the default width. Although a microphone is described in this embodiment, it is understood that other types of sensors, such as a traffic service from the remote server 112 may be used to determine the amount of traffic congestion. A camera may also be used independent of, or in conjunction with the microphone or traffic service to determine or verify the traffic congestion. The camera may be incorporated into the device 100 or in a peripheral device, such as the mobile device 116.

Another aspect of the disclosure involves pedestrian-to-vehicle communication. For example, to further the safe passage of a pedestrian, the pedestrian's zone of safety may be transmitted to one or more nearby vehicles in order to alert the vehicles' operators of the pedestrian. Such a mechanism is useful especially when visibility is poor (e.g., in rainy, snowy, foggy, or dark conditions). The distance around the pedestrian may be a fixed distance, such as 500 feet, may be configurable by the pedestrian, or may be automatically configured by the device 100 based on various conditions. Thus, in an embodiment, the transceiver 108 transmits an indication of the adaptive zone of safety to a nearby vehicle (e.g., vehicle 114), which may use the indication to display information to an operator of the nearby vehicle in order to notify the operator of the pedestrian's adaptive zone of safety. The vehicle 114 may then use the information automatically or with driver authorization or input to adjust driver assistance systems (e.g., cruise control). For example, after having been made aware of a pedestrian's zone of safety, the vehicle 114 may automatically slow the vehicle 114 and notify the driver of the pedestrian.

Figure 2:
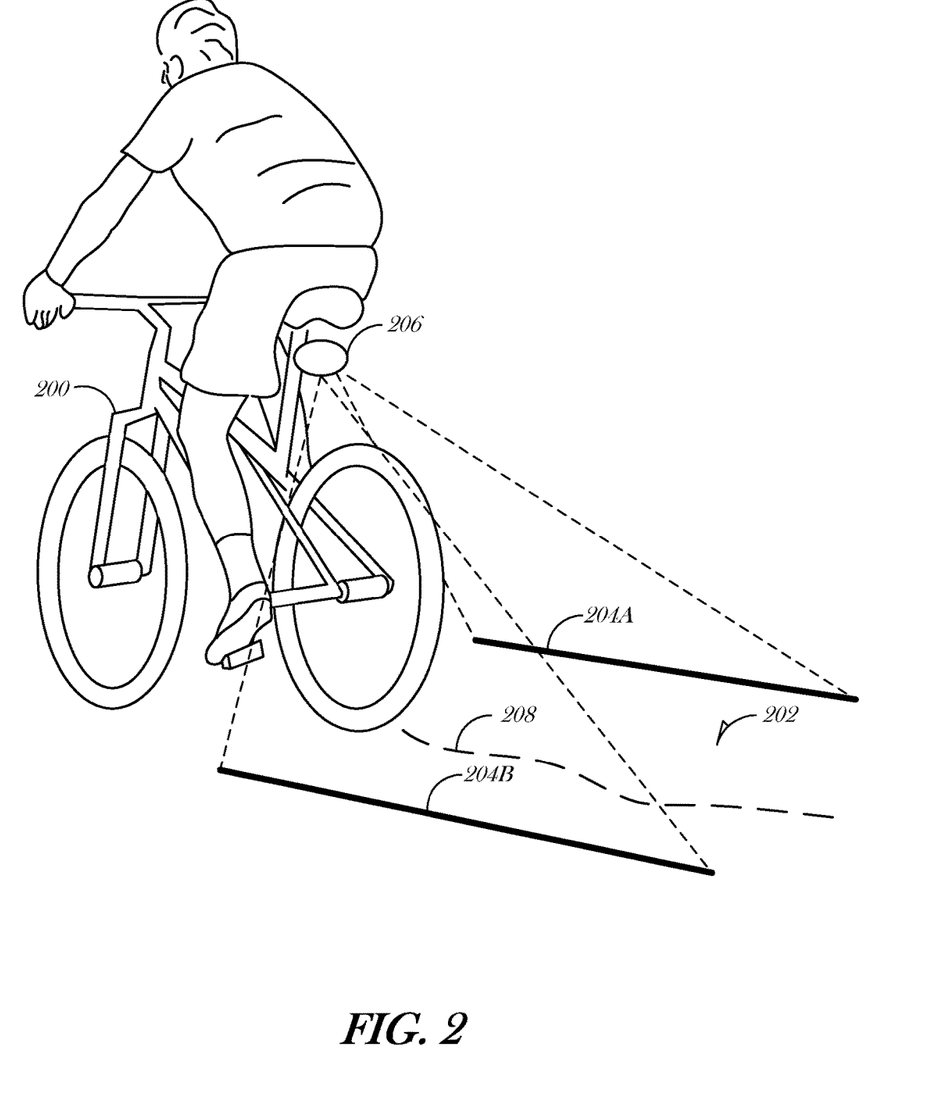
FIG. 2 illustrates a bicycle with a projected bike lane, according to an embodiment.

FIG. 2 illustrates a bicycle 200 with a projected bike lane 202, according to an embodiment. The projected bike lane 202 is formed by two lines 204A, 204B, which are projected from an apparatus 206. The apparatus 206 may be detachably affixed to a portion of the bicycle 200, such as with a clamp, screw, elastic band, or other attachment mechanism. The apparatus 206 may include one or more light projection mechanisms, such as a laser, light emitting diode (LED), compact fluorescent light, or other lighting mechanism, combined with mirrors, lenses, reflectors, or other beam focusing technology to produce the projected bike lane 202. Although the apparatus 202 is illustrated as being attached to a bicycle frame in FIG. 2, it is understood that the apparatus 202 may be attached to the rider 208 or another portion of the frame, such as the wheel hub, or other portions of the bicycle 200, such as the seat, pannier, luggage rack, towing attachment, or the like. Also, while a zone of safety is formed using two lines 204A, 204B, it is understood that a single line may be used, an arc may be used, a pattern, or other semi or solid fill may be used to designate the zone of safety (e.g., the projected bike lane 202). As the bicyclist travels the path 208, the projected bike lane 202 can be widened or narrowed adaptively to provide a larger or smaller zone of safety.

Figure 3:
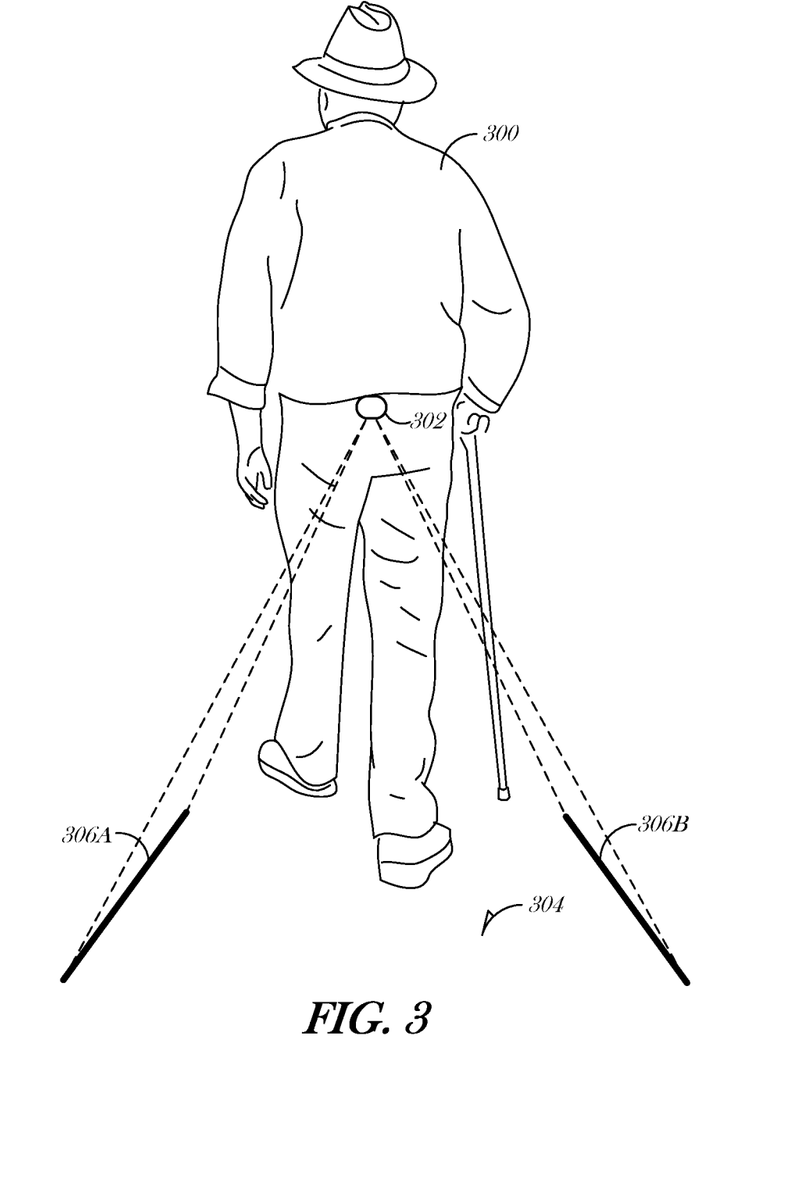
FIG. 3 illustrates a pedestrian with a worn device to project a zone of safety, according to an embodiment.

FIG. 3 illustrates a pedestrian 300 with a worn device 302 to project a zone of safety 304, according to an embodiment. As in FIG. 2, the zone of safety 304 is formed with two lines 306A, 306B. The worn device 302 may be attached to the pedestrian 300 using various mechanisms, such as with a belt loop, a hook and loop fastener, a belt clip, or the like. Using electronic and/or mechanical apparatus, the worn device 302 may accommodate for the pedestrian's gait in order to maintain a stable and stationary zone of safety 304, relative to the pedestrian 300. For example, a gyrometer or gyroscope may be used in combination with a gimbal or other mechanism to stabilize the projected zone of safety 304.

Figure 4A:
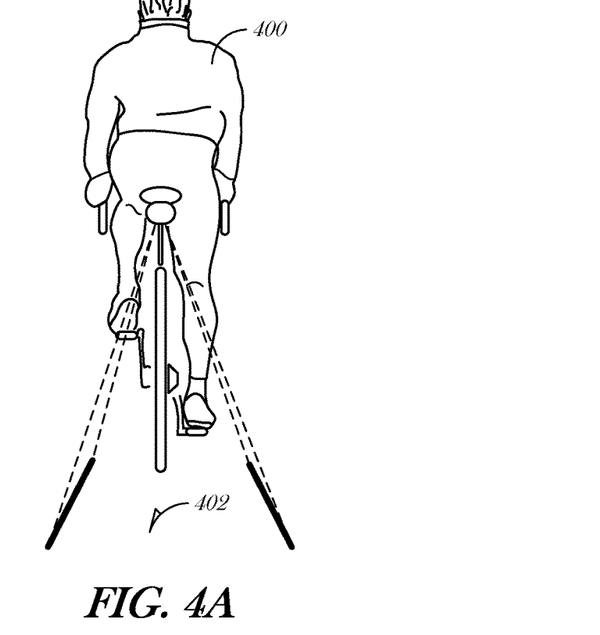
FIGS. 4A and 4B illustrate multiple orientations of a bicycle and bicyclist with a projected bike lane, according to an embodiment.
Figure 4B:
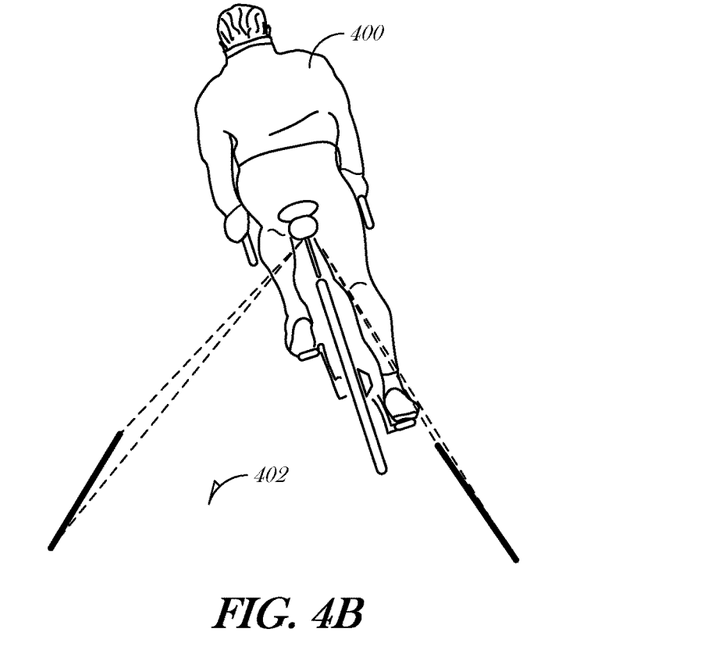

FIGS. 4A and 4B illustrate multiple orientations of a bicycle and bicyclist 400 with a projected bike lane 402, according to an embodiment. In FIG. 4A, the bicyclist 400 is travelling in a relatively straight line and the bike lane 402 is projected in a substantially uniform manner on both sides (and behind) the bicycle. When the bicyclist 400 turns, the bike lane 402 is adaptively altered such that the inside of the bike lane 402 is projected away from the bicyclist 400, to provide a larger zone of safety.

Figure 5:
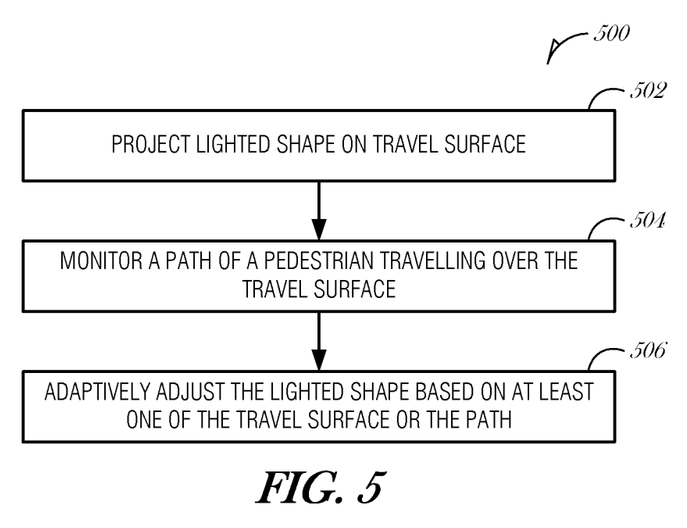
FIG. 5 is a flowchart illustrating a method for providing an adaptive zone of safety, according to an embodiment.

FIG. 5 is a flowchart illustrating a method 500 for providing an adaptive zone of safety, according to an embodiment. At block 502, a lighted shape is projected on a travel surface, the lighted shape demarcating the adaptive zone of safety. In an embodiment, the lighted shape comprises a single line. In an embodiment, the lighted shape comprises a pair of approximately parallel lines.

At block 504, using a mobile computing device, a path of a pedestrian travelling over the travel surface is monitored. In an embodiment, monitoring the path to determine the degree of wobble comprises sensing lateral movement of the pedestrian over a period of time using at least one of an accelerometer and a gyrometer. In a further embodiment, the method 500 comprises comparing the lateral movement to a historical wobble value and calculating an appropriate size of the lighted shape based on the comparison.

At block 506, the lighted shape is adaptively adjusted based on at least one of the travel surface or the path. In an embodiment, adaptively adjusting the lighted shape comprises monitoring the path to determine a degree of wobble of the path and adjusting the size of the lighted shape according the degree of wobble.

In an embodiment, the pedestrian is operating a personal transportation device, and adaptively adjusting the lighted shape comprises detecting an attitude of the personal transportation device and adjusting the size of the lighted shape according the attitude.

In an embodiment, detecting the attitude of the personal transportation device comprises using a gyrometer to detect the attitude.

In various embodiments, the personal transportation device comprises one of a bicycle, a unicycle, a skateboard, a kick scooter, a wheelchair, or inline skates.

In an embodiment, detecting the attitude of the personal transportation device comprises detecting that the personal transportation device is turning and adjusting the size of the lighted shape comprises adjusting the size of the lighted shape to accommodate the turning.

In an embodiment, adaptively adjusting the lighted shape comprises determining a condition of the travel surface and adjusting the size of the lighted shape according the condition of the travel surface. In a further embodiment, determining the condition of the travel surface comprises accessing a sensor mounted to a personal transportation vehicle that the pedestrian is operating to obtain an environmental variable and using the environmental variable to identify the condition of the travel surface.

In an embodiment, the sensor comprises a moisture sensor, the environmental variable comprises wetness, and the condition of the travel surface is identified as being some degree from dry to wet.

In an embodiment, the sensor comprises microphone incorporated in a mobile device, wherein the environment variable comprises a noise level indicative of other traffic on or near the travel surface, and the condition of the travel surface is identified as being some degree from free flowing to congested.

In a further embodiment, the method 500 comprises transmitting an indication of the adaptive zone of safety to a nearby vehicle, which may use the indication to display information to an operator of the nearby vehicle in order to notify the operator of the pedestrian's adaptive zone of safety.

While some of the examples described herein refer to a bicycle, it is understood that any personal transportation device that is used on or near a road may be equipped with a system or device to project an adaptive zone of safety. Personal transportation devices include, but are not limited to bicycles, tricycles, unicycles, skateboards, kick scooters, wheelchairs, Segway®, inline skates, or the like.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
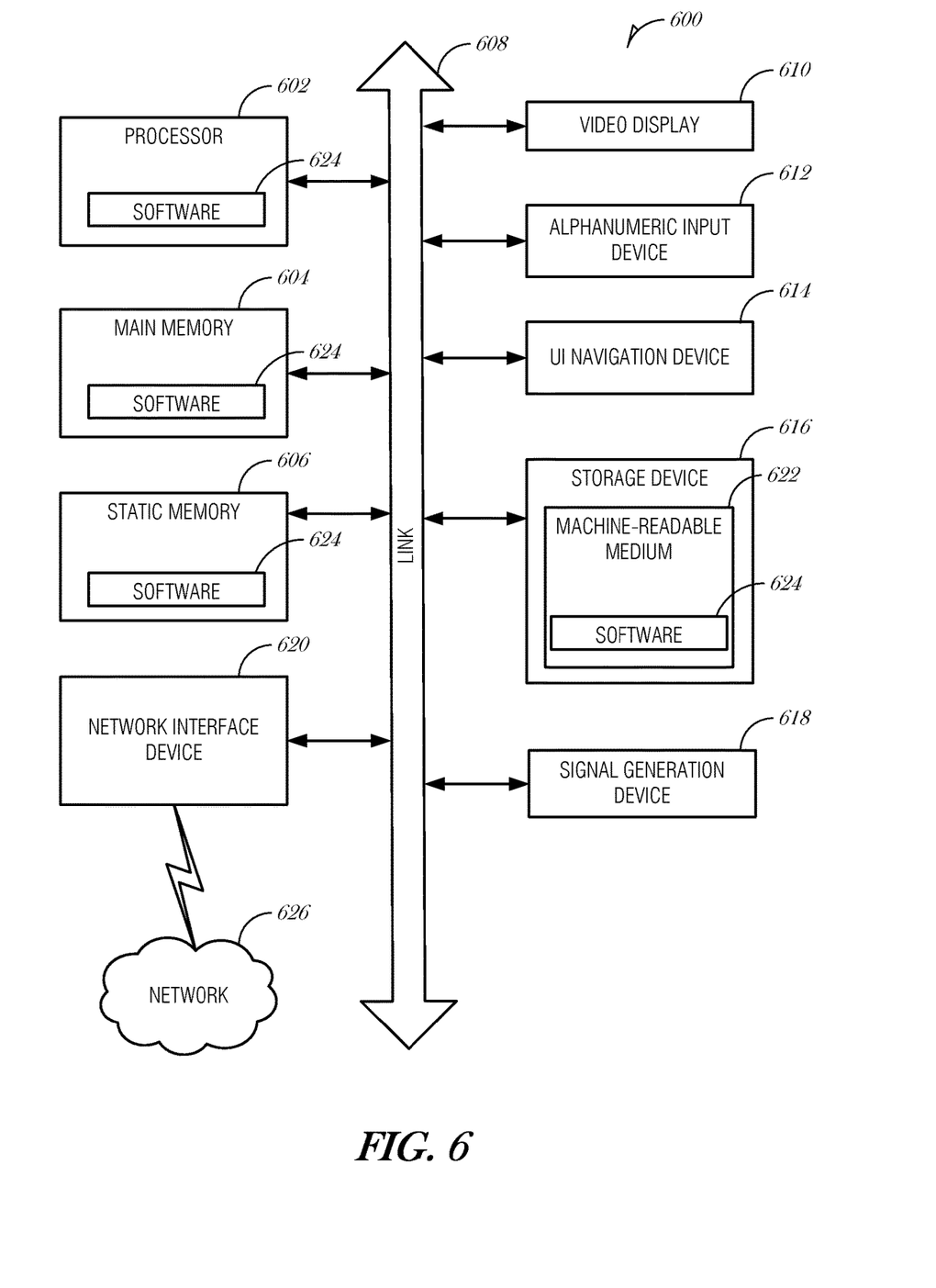
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) comprising a system to provide an adaptive zone of safety, comprising: a projector to project a lighted shape on a travel surface, the lighted shape demarcating the adaptive zone of safety; a monitor to monitor a path of a pedestrian travelling over the travel surface; and a computing module to adaptively adjust the lighted shape based on at least one of the travel surface or the path.

In Example 2, the subject matter of Example 1 may optionally include, wherein the lighted shape is a single line.

In Example 3 the subject matter of any one or more of Examples 1 to 2 may optionally include, wherein the lighted shape comprises a pair of approximately parallel lines.

In Example 4 the subject matter of any one or more of Examples 1 to 3 may optionally include, wherein to adaptively adjust the lighted shape, the computing device is to: monitor the path to determine a degree of wobble of the path; and adjust the size of the lighted shape according the degree of wobble.

In Example 5 the subject matter of any one or more of Examples 1 to 4 may optionally include, wherein to monitor the path to determine the degree of wobble, the computing module is to sense lateral movement of the pedestrian over a period of time using at least one of an accelerometer and a gyrometer.

In Example 6 the subject matter of any one or more of Examples 1 to 5 may optionally include, wherein the computing module is to: compare the lateral movement to a historical wobble value; and calculate an appropriate size of the lighted shape based on the comparison.

In Example 7 the subject matter of any one or more of Examples 1 to 6 may optionally include, wherein the pedestrian is operating a personal transportation device, and wherein to adaptively adjusts the lighted shape, the computing module is to: detect an attitude of the personal transportation device; and adjust the size of the lighted shape according the attitude.

In Example 8 the subject matter of any one or more of Examples 1 to 7 may optionally include, wherein to detect the attitude of the personal transportation device, the computing module is to use a gyrometer to detect the attitude.

In Example 9 the subject matter of any one or more of Examples 1 to 8 may optionally include, wherein the personal transportation device comprises one of a bicycle, a unicycle, a skateboard, a kick scooter, a wheelchair, or inline skates.

In Example 10 the subject matter of any one or more of Examples 1 to 9 may optionally include, wherein when detecting the attitude of the personal transportation device the computing module is to detect that the personal transportation device is turning and adjusts the size of the lighted shape to accommodate the turning.

In Example 11 the subject matter of any one or more of Examples 1 to 10 may optionally include, wherein to adaptively adjust the lighted shape, the computing module is to: determine a condition of the travel surface; and adjust the size of the lighted shape according the condition of the travel surface.

In Example 12 the subject matter of any one or more of Examples 1 to 11 may optionally include, wherein to determine the condition of the travel surface, the computing module is to: access a sensor mounted to a personal transportation vehicle that the pedestrian is operating to obtain an environmental variable; and use the environmental variable to identify the condition of the travel surface.

In Example 13 the subject matter of any one or more of Examples 1 to 12 may optionally include, wherein the sensor comprises a moisture sensor, and wherein the environmental variable comprises wetness, and wherein the condition of the travel surface is identified as being some degree from dry to wet.

In Example 14 the subject matter of any one or more of Examples 1 to 13 may optionally include, wherein the sensor comprises microphone incorporated in a mobile device, and wherein the environment variable comprises a noise level indicative of other traffic on or near the travel surface, and wherein the condition of the travel surface is identified as being some degree from free flowing to congested.

In Example 15 the subject matter of any one or more of Examples 1 to 14 may optionally include, a transceiver to transmit an indication of the adaptive zone of safety to a nearby vehicle, the nearby vehicle to use the indication to display information to an operator of the nearby vehicle in order to notify the operator of the pedestrian's adaptive zone of safety.

Example 16 includes subject matter for providing an adaptive zone of safety (such as a method, means for performing acts, machine readable medium including instructions that when performed by a machine cause the machine to performs acts, or an apparatus configured to perform) comprising projecting a lighted shape on a travel surface, the lighted shape demarcating the adaptive zone of safety; monitoring, using a mobile computing device, a path of a pedestrian travelling over the travel surface; and adaptively adjusting the lighted shape based on at least one of the travel surface or the path.

In Example 17, the subject matter of Example 16 may optionally include, wherein the lighted shape is a single line.

In Example 18 the subject matter of any one or more of Examples 16 to 17 may optionally include, wherein the lighted shape comprises a pair of approximately parallel lines.

In Example 19 the subject matter of any one or more of Examples 16 to 18 may optionally include, wherein adaptively adjusting the lighted shape comprises: monitoring the path to determine a degree of wobble of the path; and adjusting the size of the lighted shape according the degree of wobble.

In Example 20 the subject matter of any one or more of Examples 16 to 19 may optionally include, wherein monitoring the path to determine the degree of wobble comprises sensing lateral movement of the pedestrian over a period of time using at least one of an accelerometer and a gyrometer.

In Example 21 the subject matter of any one or more of Examples 16 to 20 may optionally include, comparing the lateral movement to a historical wobble value; and calculating an appropriate size of the lighted shape based on the comparison.

In Example 22 the subject matter of any one or more of Examples 16 to 21 may optionally include, wherein the pedestrian is operating a personal transportation device, and wherein adaptively adjusting the lighted shape comprises: detecting an attitude of the personal transportation device; and adjusting the size of the lighted shape according the attitude.

In Example 23 the subject matter of any one or more of Examples 16 to 22 may optionally include, wherein detecting the attitude of the personal transportation device comprises using a gyrometer to detect the attitude.

In Example 24 the subject matter of any one or more of Examples 16 to 23 may optionally include, wherein the personal transportation device comprises one of a bicycle, a unicycle, a skateboard, a kick scooter, a wheelchair, or inline skates.

In Example 25 the subject matter of any one or more of Examples 16 to 24 may optionally include, wherein detecting the attitude of the personal transportation device comprises detecting that the personal transportation device is turning; and wherein adjusting the size of the lighted shape comprises adjusting the size of the lighted shape to accommodate the turning.

In Example 26 the subject matter of any one or more of Examples 16 to 25 may optionally include, wherein adaptively adjusting the lighted shape comprises: determining a condition of the travel surface; and adjusting the size of the lighted shape according the condition of the travel surface.

In Example 27 the subject matter of any one or more of Examples 16 to 26 may optionally include, wherein determining the condition of the travel surface comprises: accessing a sensor mounted to a personal transportation vehicle that the pedestrian is operating to obtain an environmental variable; and using the environmental variable to identify the condition of the travel surface.

In Example 28 the subject matter of any one or more of Examples 16 to 27 may optionally include, wherein the sensor comprises a moisture sensor, and wherein the environmental variable comprises wetness, and wherein the condition of the travel surface is identified as being some degree from dry to wet.

In Example 29 the subject matter of any one or more of Examples 16 to 28 may optionally include, wherein the sensor comprises microphone incorporated in a mobile device, and wherein the environment variable comprises a noise level indicative of other traffic on or near the travel surface, and wherein the condition of the travel surface is identified as being some degree from free flowing to congested.

In Example 30 the subject matter of any one or more of Examples 16 to 29 may optionally include, transmitting an indication of the adaptive zone of safety to a nearby vehicle, which may use the indication to display information to an operator of the nearby vehicle in order to notify the operator of the pedestrian's adaptive zone of safety.

Example 31 includes a machine-readable medium including instructions that when performed by a machine cause the machine to perform any one of the examples of 1-30.

Example 32 includes subject matter for providing an adaptive zone of safety comprising means for performing any one of the examples of 1-30.

Example 33 includes an apparatus for providing an adaptive zone of safety, the apparatus comprising: means for projecting a lighted shape on a travel surface, the lighted shape demarcating the adaptive zone of safety; means for monitoring, using a mobile computing device, a path of a pedestrian travelling over the travel surface; and means for adaptively adjusting the lighted shape based on at least one of the travel surface or the path.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus to provide an adaptive zone of safety, the apparatus comprising:
   a projector to project a lighted shape on a travel surface, the lighted shape demarcating the adaptive zone of safety;
   a monitor to monitor a path of a pedestrian travelling over the travel surface; and a computing module to adaptively adjust the lighted shape based on at least one of the travel surface or the path,
   wherein to adaptively adjust the lighted shape, the computing module is to: determine a condition of the travel surface; and
   adjust a size of the lighted shape according the condition of the travel surface, wherein to determine the condition of the travel surface, the computing module is to:
   access a sensor mounted to a personal transportation vehicle that the pedestrian is operating to obtain an environmental variable; and
   use the environmental variable to identify the condition of the travel surface, wherein the sensor comprises microphone incorporated in a mobile device, wherein the environment variable comprises a noise level indicative of other traffic on or near the travel surface, and wherein the condition of the travel surface is identified as being some degree from free flowing to congested.

2. The apparatus of claim 1, wherein the lighted shape is a single line.

3. The apparatus of claim 1, wherein the lighted shape comprises a pair of approximately parallel lines.

4. The apparatus of claim 1, wherein to adaptively adjust the lighted shape, the computing device is to:
monitor the path to determine a degree of wobble of the path; and
adjust the size of the lighted shape according the degree of wobble.

5. The apparatus of claim 4, wherein to monitor the path to determine the degree of wobble, the computing module is to sense lateral movement of the pedestrian over a period of time using at least one of an accelerometer and a gyrometer.

6. The apparatus of claim 4, wherein the computing module is to:
compare the lateral movement to a historical wobble value; and
calculate an appropriate size of the lighted shape based on the comparison.

7. The apparatus of claim 1, wherein the pedestrian is operating a personal transportation device, and wherein to adaptively adjusts the lighted shape, the computing module is to:
detect an attitude of the personal transportation device; and
adjust the size of the lighted shape according the attitude.

8. The apparatus of claim 7, wherein to detect the attitude of the personal transportation device, the computing module is to use a gyrometer to detect the attitude.

9. The apparatus of claim 7, wherein the personal transportation device comprises one of a bicycle, a unicycle, a skateboard, a kick scooter, a wheelchair, or inline skates.

10. The apparatus of claim 7, wherein when detecting the attitude of the personal transportation device the computing module is to detect that the personal transportation device is turning and adjusts the size of the lighted shape to accommodate the turning.

11. The apparatus of claim 1, wherein the sensor comprises a moisture sensor, and wherein the environmental variable comprises wetness, and wherein the condition of the travel surface is identified as being some degree from dry to wet.

12. The apparatus of claim 1, further comprising:
a transceiver to transmit an indication of the adaptive zone of safety to a nearby vehicle, the nearby vehicle to use the indication to display information to an operator of the nearby vehicle in order to notify the operator of the pedestrian's adaptive zone of safety.

13. A method for providing an adaptive zone of safety, the method comprising:
projecting a lighted shape on a travel surface, the lighted shape demarcating the adaptive zone of safety;
monitoring, using a mobile computing device, a path of a pedestrian travelling over the travel surface; and
adaptively adjusting the lighted shape based on at least one of the travel surface or the path,
wherein adaptively adjusting the lighted shape comprises:
determining a condition of the travel surface; and
adjusting a size of the lighted shape according the condition of the travel surface,
wherein determining the condition of the travel surface comprises:
accessing a sensor mounted to a personal transportation vehicle that the pedestrian is operating to obtain an environmental variable; and
using the environmental variable to identify the condition of the travel surface, wherein the sensor comprises microphone incorporated in a mobile device, wherein the environment variable comprises a noise level indicative of other traffic on or near the travel surface, and
wherein the condition of the travel surface is identified as being some degree from free flowing to congested.

14. The method of claim 13, wherein the lighted shape is a single line.

15. The method of claim 13, wherein the lighted shape comprises a pair of approximately parallel lines.

16. The method of claim 13, wherein adaptively adjusting the lighted shape comprises:
monitoring the path to determine a degree of wobble of the path; and
adjusting the size of the lighted shape according the degree of wobble.

17. The method of claim 16, wherein monitoring the path to determine the degree of wobble comprises sensing lateral movement of the pedestrian over a period of time using at least one of an accelerometer and a gyrometer.

18. The method of claim 16, further comprising:
comparing the lateral movement to a historical wobble value; and
calculating an appropriate size of the lighted shape based on the comparison.

19. The method of claim 13, wherein the pedestrian is operating a personal transportation device, and wherein adaptively adjusting the lighted shape comprises:
detecting an attitude of the personal transportation device; and
adjusting the size of the lighted shape according the attitude.

20. A non-transitory machine-readable medium including instructions for providing an adaptive zone of safety, which when executed by a machine, cause the machine to:
project a lighted shape on a travel surface, the lighted shape demarcating the adaptive zone of safety;
monitor a path of a pedestrian travelling over the travel surface; and
adaptively adjust the lighted shape based on at least one of the travel surface or the path, wherein adaptively adjusting the lighted shape comprises:
determining a condition of the travel surface; and
adjusting a size of the lighted shape according the condition of the travel surface, wherein determining the condition of the travel surface comprises:
accessing a sensor mounted to a personal transportation vehicle that the pedestrian is operating to obtain an environmental variable; and
using the environmental variable to identify the condition of the travel surface, wherein the sensor comprises microphone incorporated in a mobile device, wherein the environment variable comprises a noise level indicative of other traffic on or near the travel surface, and
wherein the condition of the travel surface is identified as being some degree from free flowing to congested.

21. The non-transitory machine-readable medium of claim 20, wherein the instructions to adaptively adjust the lighted shape comprise instructions to:
monitor the path to determine a degree of wobble of the path; and
adjust the size of the lighted shape according the degree of wobble.

22. The non-transitory machine-readable medium of claim 21, wherein the instructions to monitor the path to determine the degree of wobble comprise instructions to sense lateral movement of the pedestrian over a period of time using at least one of an accelerometer and a gyrometer.

23. The non-transitory machine-readable medium of claim 21, further comprising instructions to:
   compare the lateral movement to a historical wobble value; and
   calculate an appropriate size of the lighted shape based on the comparison.

* * * * *

UNITED STATES PATENT AND TRADEMARK OFFICE
CERTIFICATE OF CORRECTION

PATENT NO. : 9,656,602 B2  
APPLICATION NO. : 14/353146  
DATED : May 23, 2017  
INVENTOR(S) : Needham et al.

Page 1 of 1

It is certified that error appears in the above-identified patent and that said Letters Patent is hereby corrected as shown below:

In the Claims

In Column 12, Line 45, in Claim 1, after "and", insert --¶--

In Column 12, Line 49, in Claim 1, after "to", insert --¶--

Signed and Sealed this
Seventeenth Day of April, 2018

Andrei Iancu
*Director of the United States Patent and Trademark Office*